United States Patent [19]

Kubota et al.

[11] Patent Number: 4,470,669

[45] Date of Patent: Sep. 11, 1984

[54] LIQUID CRYSTAL DISPLAY DEVICE

[75] Inventors: Keiichi Kubota; Masakazu Nakano, both of Tokyo, Japan

[73] Assignee: Nippon Electric Co., Ltd., Tokyo, Japan

[21] Appl. No.: 333,504

[22] Filed: Dec. 22, 1981

[30] Foreign Application Priority Data

Dec. 22, 1980 [JP] Japan .................................. 55-181493

[51] Int. Cl.$^3$ ............................................... G02F 1/13
[52] U.S. Cl. ................................. 350/351; 350/350 S
[58] Field of Search ...................... 350/342, 351, 350 S

[56] References Cited

U.S. PATENT DOCUMENTS

| | | | |
|---|---|---|---|
| 3,796,999 | 3/1974 | Kahn ................... | 350/351 X |
| 3,836,243 | 9/1974 | Melchior ............... | 350/351 X |
| 4,019,807 | 4/1977 | Boswell et al. ......... | 350/342 |
| 4,150,396 | 4/1979 | Hareng et al. .......... | 350/351 X |
| 4,277,145 | 7/1981 | Hareng et al. .......... | 350/351 |

OTHER PUBLICATIONS

Dewey, A. et al., "Laser-Addressed Liquid Crystal Projection Displays," *Proceedings of the S.I.D.*, vol. 19:1 (First Quarter 1978) pp. 1–7.

Beard, T. D. et al., "AC Liquid Crystal Light Valve," *Applied Physics Lett.*, vol. 22:3 (Feb. 1, 1973) pp. 90–92.

*Primary Examiner*—John K. Corbin
*Assistant Examiner*—Richard F. Gallivan

*Attorney, Agent, or Firm*—Sughrue, Mion, Zinn, Macpeak & Seas

[57] ABSTRACT

A thermally addressable liquid crystal display device is disclosed herein. The device comprises twin transparent plates with a liquid crystal element disposed between them. A transparent electrode film is provided onto the inside surface of the first transparent plate (the inside surface being that surface which is in contact with the liquid crystal element). Both a light-reflecting film and a light-absorbing single layer are provided onto the inside surface of the second transparent plate. This light-absorbing layer is formed of an inorganic semiconductor compound selected from the group of II-V group semiconductor compounds containing magnesium or calcium, II-V group semiconductor compounds containing zinc or cadmium, or II-VI group and V-VI group semiconductor compounds containing tellurium. Preferably, the light-absorbing layer has a thickness which satisfies the relationship $$t = \lambda/4n \pm \lambda/20n$$

such that the resulting image display is high in image resolution. Further, by providing to the display device a light absorption layer with a thickness as determined by the above-mentioned relationship, the overall reliability of the display device is improved.

5 Claims, 4 Drawing Figures

LIQUID CRYSTAL DISPLAY DEVICE

BACKGROUND OF THE INVENTION

The present invention relates to a thermally addressable liquid crystal display device, and more particularly to a laser-addressed high-resolution liquid crystal light valve.

Display devices used as the terminal devices of computers are required to have high resolution, due to the large capacities and increased capabilities of modern day large and small frame computers. In such computer applications such as image processing, newspaper composition, LSI design, etc., it is especially important that the display devices have both high resolution and discrete display element addressing. In a conventional cathode ray tube (CRT) such displays have not been realized due to the difficulty of enhancing resolution up to 2000 lines or more for a given display area. Accordingly, other display devices which could potentially produce higher resolution have been investigated. In an article entitled "Laser-Addressed Liquid Crystal Projection Displays" in the technical journal "Proceeding of the S.I.D." Vol. 19, No. 1, First Quarter 1978, p.p. 1-7, A. G. Dewey et al discusses a laser-addressed smectic liquid crystal light valve. Both a dielectric multi-layer film and a reflective electrode film are formed onto a rear glass plate. A front glass plate is provided with a transparent electrode film. Both front and rear glass plates are further provided with alignment films for alignment with respect to one another. A liquid crystal material is sandwiched between the rear and front glass plates. When a laser beam is focused onto the dielectric multi-layer films of the rear glass plate, it is absorbed and converted into heat. The heat is transmitted through both the reflective electrode film and the alignment film of the rear glass plate, raising the temperature of the liquid crystal material. A smectic liquid crystal is used as the liquid crystal material, such that as the temperature rises, the liquid crystal undergoes a nematic to liquid phase change. When the laser beam is subsequently removed, this phase change results in the random alignment of liquid crystal molecules in a frozen scattering mode. The scattering mode is "read out" by a light projected from the side of the front glass plate, and displayed on a screen.

According to this display technique, a line width of 10 $\mu$m can be generated, such that over 5000 lines of information can be recorded in a single liquid crystal light valve of two inches square. Thus, it is possible to realize a display which has a high resolution as compared to the conventional CRT display devices of the prior art.

Since the liquid crystal light valve operates to record information by converting laser light into heat, the speed and the contrast of the liquid crystal display are closely related to the light adsorption characteristic of the dielectric multi-layer films. To accurately form the dielectric multi-layer films, it is necessary to vapor-deposit onto the rear glass plate inorganic materials having high refractive indices (such as zinc sulfide (ZnS), arsenic sulfide ($As_2S_3$), etc. However, in such a multi-layer structure, gaps between layers occurs where the lattice constants of the respective layers have not been accurately matched. This serves to adversely affect the overall reliability of the display device.

SUMMARY OF THE INVENTION

An object of the present invention is to provide a reflective-type liquid crystal display device which is easy to manufacture.

Another object of the present invention is to provide a reflective-type laser-addressed liquid crystal light valve employing a single layer that is easily formed and is of high light absorption efficiency and reliability.

According to the present invention, a thermally addressable liquid crystal display device has a single layer of a compound semiconductor between a first transparent plate and a reflective electrode film. A transparent electrode film is provided on a second transparent plate, and a liquid crystal material is sandwiched between the pair of transparent plates. The semiconductor compound layer comprises a II-IV group compound containing magnesium (Mg) or calcium (Ca), a II-V group compound containing zinc (Zn) or either cadmium (Cd), or a II-VI group or a V-VI group compound containing tellurium.

Favorably, the thickness of the compound layer is chosen to be about 250 Å to 2500 Å, and especially it is favorable to select the thickness to be equal to $\lambda/4n$, where $\lambda$ represents the wavelength of an addressing light beam, and n represents the refractive index of the compound layer.

DESCRIPTION OF THE PREFERRED EMBODIMENTS

A liquid crystal display device according to the present invention employs a single layer light adsorber which consists of a monolithic semiconductor having both a band gap (as converted into wavelength) smaller than the wavelength of an addressing laser beam and a sufficiently high layer absorption efficiency. In practice, if an argon laser beam of 5145 Å in wavelength is used as the writing laser beam, semiconductor compounds having a band gap of 2.40 eV or less can be used. Examples of such semiconductor compounds are II-IV group or II-V group compounds containing magnesium (Mg) or calcium (Ca), such as $Mg_2Si$, $Mg_2Ge$, $Mg_2Sn$, $Ca_2Si$, $Ca_2Sn$, $Ca_2Pb$ and $Mg_3Sb_2$; II-V group or II-VI group compounds containing zinc (Zn) or Cadmium (Cd), such as $ZnAs_2$, $Zn_3As_2$, $ZnSb$, $Cd_3As_2$, $CdSb$, $CdS$ and $CdSe$; and II-VI group or V-VI group compound containing tellurium (Te) such as $ZnTe$, $CdTe$ and $Sb_2Te_3$.

Table 1 shows the above-mentioned groups of inorganic semiconductor compounds with their associated band gaps. As for the semiconductor compound layers having band gaps of 1.4 eV or less, it is favorable to use a GaAs semiconductor laser as a writing laser beam. Helium-neon gas laser can be used for the compound layer having a band gap of 1.8 eV or less. Cermet (a vitreous resistance film containing metal such as chromium (Cr), gold (Au), etc.) may also be employed as the semiconductor compound. Any of these materials can be easily formed into a monolithic layer on the first glass plate through vapor-deposition or sputtering, and a thin layer of such a material can serve as a strong absorber for a laser beam. Moreover, since the thermal conductivity of such a material is small, it eliminates the generated heat propagated along the layer surface which results in the decrease in resolution of liquid crystal display devices which utilize conventional dielectric multi-layer compositions.

TABLE 1

| group | compound | band gap (eV) |
|---|---|---|
| II - IV | $Mg_2Si$ | 0.77 |
|  | $Mg_2Ge$ | 0.74 |
|  | $Mg_2Sn$ | 0.21 |
|  | $Ca_2Si$ | 1.9 |
|  | $Ca_2Sn_2$ | 0.9 |
|  | $Ca_2Pb$ | 0.5 |
| II - V | $ZnAs_2$ | 0.92 |
|  | $Zn_3As_2$ | 0.93 |
|  | AnSb | 0.56 |
|  | $Cd_3As_2$ | 0.13 |
|  | CdSb | 0.5 |
|  | $Mg_3Sb_2$ | 0.8 |
| II - VI | ZnTe | 2.1 |
|  | CdS | 2.4 |
|  | CdSe | 1.7 |
|  | CdTe | 1.4 |
| V - VI | $Sb_2Te_3$ | 0.3 |

Figure 1:
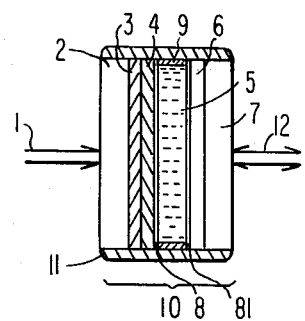
FIG. 1 is a schematic cross-sectional view showing a liquid crystal display device according to one embodiment of the present invention.
Figure 2:
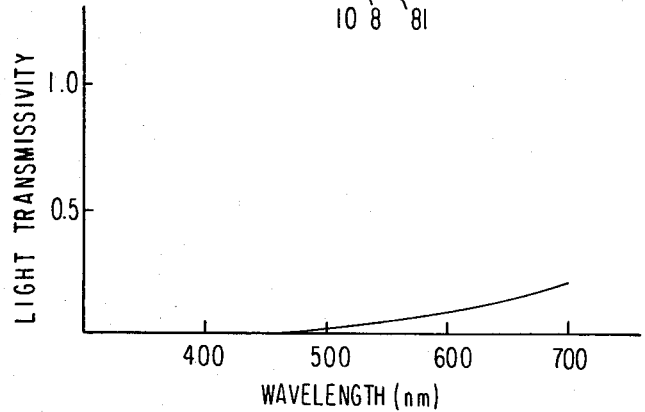
FIG. 2 is a graph of the light transmissivity of a CdTe layer of 2000 Å in thickness as a function of increasing wavelength.

An embodiment of a liquid crystal light valve having a CdTe layer as the absorption layer according to the present invention will now be described in greater detail. With reference to FIG. 1, a CdTe layer 3 is deposited by sputtering onto a glass plate 2. An aluminum reflective film 4 up to a thickness of 500 Å is then deposited by evaporation onto the CdTe layer 3. A silicon oxide (SiO) film 8 as a parallel alignment film was obliquely evaporated onto the aluminum reflective film up to a thickness of 150 Å. The alignment film align a liquid crystal molecule such that it is parallel to the glass plate. Note that a parallel alignment film in order to maximize display contrast is preferred to a perpendicular alignment film. In a second glass plate 7, a transparent electrode 6 of indium oxide is formed in the thickness of 360 Å, onto which a parallel alignment silicon oxide (SiO) film 81 is obliquely evaporated. A spacer 9 preferably of a polyester film 12 μm in thickness is then disposed between the two glass plates. The assembly is then bonded and sealed with a bonding resin 11. An n-octyl cyanobiphenyl is injected into the space delineated by spacer 9 through an injection port (not shown) provided in the glass plate to form a smectic liquid crystal layer 5 under a vacuum. The injection port is sealed off with silicone resin. In this embodiment, a single layer of about 2000 Å in thickness, obtained by sputtering CdTe within an argon gas atmosphere for 15 minutes, is used as the light absorbing layer 3. As shown in FIG. 2, the CdTe layer 3 presents a transmissivity of about 2% for an argon laser beam of 5145 Å in wavelength, and thus can absorb more than 90% of the incident laser beam energy. A picture image is recorded in the liquid crystal light valve 10 by scanning a writing laser beam 1 on the first glass plate 2. The picture image is displayed as a reflection image by then irradiating the liquid crystal light valve 10 with projection light 12. Thus, a liquid crystal light valve having an excellent laser-recording sensitivity can be easily and reliably obtained by employing a single layer of inorganic semiconductor compound as the light absorbing layer.

Figure 3:
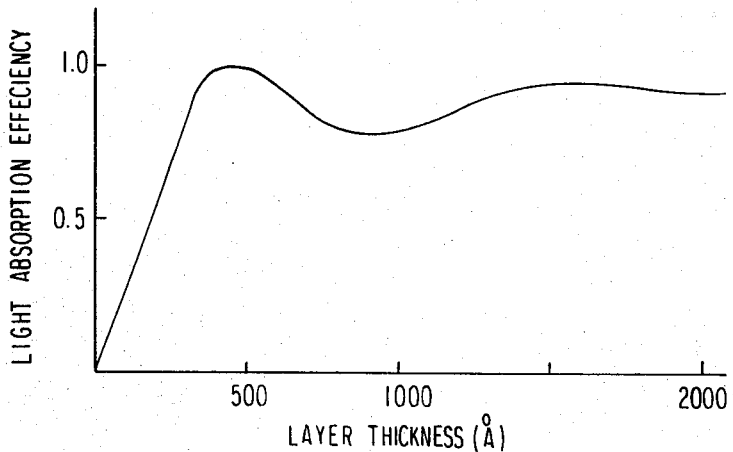
FIG. 3 is a graph of the relation between the thickness and the light adsorption efficiency of a CdTe layer.

In the above-described embodiment, by depositing a light absorbing CdTe layer of a thickness of about 2000 Å onto the first glass plate, more than 90% of the incident laser beam energy can be absorbed. The thickness of the absorption layer may range from about 250 Å to 2500 Å, depending upon the display contrast in the liquid crystal light valve that is desired. The display contrast of the display device is defined as the ratio of the reflection intensity of the non-addressed portion of surface of the transparent electrode 6 to that of its addressed portion or surface. The display contrast of the liquid crystal light valve itself ultimately depends upon its temperaure-induced phase change. Therefore, since all the proposed semiconductor compounds are thermal insulators, it is desirable to reduce the thickness of the light absorption layer. However, as the absorbing layer is thinned, its light absorption efficiency is decreased. Nevertheless, in the case of such a dielectric material having a high refractive index and absorption properties, the adsorption efficiency increases as the layer thickness is reduced to the point where $t = \lambda/4n$ (t being the thickness, λ being the light wavelength and n being the refractive index of the layer). This phenomena is due to light interference effect inherent in the absorption layer. FIG. 3 illustrates this tendency, wherein the layer thickness is taken along the abscissa and the light absorption efficiency is taken along the ordinate. When the light absorbing layer is as thick as 2000 Å, a sufficiently large light absorption efficiency is obtained. As the layer thickness is reduced to approximately 1000 Å the absorption efficiency decreases. However, if the layer thickness is then further reduced, the absorption efficiency increases due to an interference effect, and becomes a maximum at a layer thickness in the proximity of $t = \lambda/4n$. If the layer thickness is reduced past this particular value, the absorption efficiency decreases rapidly. This maximum value is realized, for example, in the case of a CdTe layer of approximately of 400 Å. Then, by selecting the layer thickness to be equal to or near $t = \lambda/4n$, it is possible to maintain a large light absorption efficiency while minimizing the layer thickness, which, as described previously, enhances the display contrast of the device.

Figure 4:
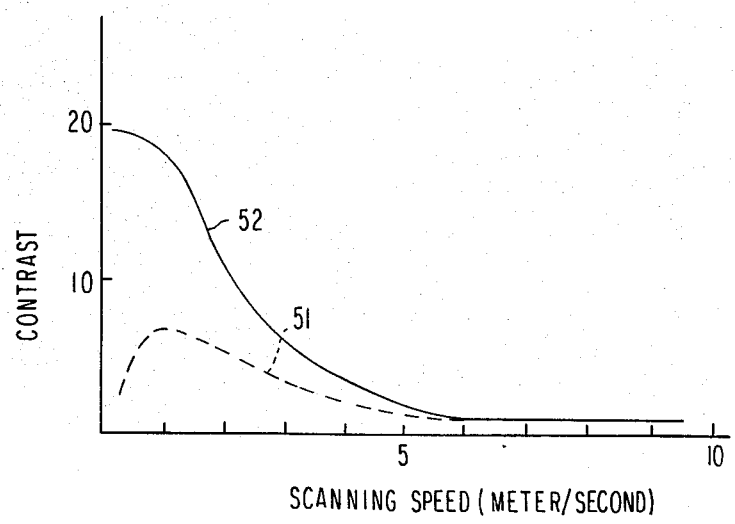
FIG. 4 is a graph of the relation between the scanning speed and the contrast in a liquid crystal light valve according to the present invention.

FIG. 4 shows the display contrast in a recorded line when the liquid crystal light valve is irradiated with an argon laser beam (5145 Å with λ =) while maintaining a constant recording power of 75 mW. The display contrast is plotted, as a function of the scanning speed of the recording laser beam, with respect to the cases where the thickness of the CdTe layer 3 is 2000 Å (curve 51) and 400 Å (curve 52), respectively. Comparing the respective display contrasts at a scanning speed of about 1 meter per second, it can be seen that a layer thickness of λ/4n (400 Å in this example) provides a display contrast about three-fold greater than that of a layer thickness of 2000 Å.

In the foregoing embodiments, it is contemplated an argon gas laser be used as the writing laser beam. This is because the light intensity of an argon gas laser is high, as compared to that of a semiconductor laser or He-Ne gas laser.

Furthermore, since the argon laser beam is visible, an addressing optical system can be more readily designed.

In a thermally addressable liquid crystal, such as that of the present invention, it is desirable to increase the utility factor of the laser beam energy while also providing a suffient display speed. In this respect, a light absorption layer should absorb at least 70%, and preferably should absorb up to 90% or more, of the laser beam. As shown in FIG. 3, in order to satisfy the 70% absorption minimum, the thickness of the absorption layer must be more than 250 Å, and the 90% or more absorption goal can be attained by a layer thickness to be either more than 1300 Å or between 300 Å and 600 Å. By determining the layer thickness according to the relation $t = \lambda/4n$, more than 95% absorption can be obtained, and a sufficiently high display contrast can be attained.

In summary, a high display contrast can be attained by determining the layer thickness according to the relation $t = (\lambda/4n) \pm (\lambda/20n)$, where the laser beam is absorbed in the order of 90%-95%. By providing a single absorption layer with a thickness that satisfies the above relation, the resulting liquid crystal display will have a greater resolution and higher reliability than those of the prior art.

What is claimed is:

1. A liquid crystal display device comprising: first and second transparent plates, a liquid crystal layer disposed between said first and second transparent plates, a transparent electrode film disposed between said first transparent plates and said liquid crystal layer, a light reflective film disposed between said second transparent plate and said liquid crystal layer, and a single layer of inorganic compound disposed between said light reflective film and said second transparent plate, said single layer being formed of a semiconductor compound selected from the group of $Mg_2Si$, $Mg_2Ge$, $Mg_2Sn$, $Ca_2Si$, $Ca_2Sn$, $Ca_2Pb$, $ZnAs_2$, $Zn_3As_2$, $ZnSb$, $Cd_3As_2$, $CdSb$, $Mg_3Sb_2$, $CdTe$, and $Sb_2Te_3$, and having a thickness ranging from 250 angstroms to 2,500 angstroms.

2. The device according to claim 1, wherein said liquid crystal layer is formed of smectic liquid crystal.

3. The device of claim 1, wherein said light reflective film is formed of aluminum.

4. The device of claim 3, wherein said single layer is formed of CdTe.

5. A liquid crystal display device comprising: first and second transparent plates, a liquid crystal layer disposed between said first and second transparent plates, a transparent electrode film disposed between said first transparent plate and said liquid crystal layer, a light reflective film disposed between said second transparent plate and said liquid crystal layer, and a single layer of inorganic compound disposed between said light reflective film and said second transparent plate, said single layer being formed of a semiconductor compound selected from the group of $Mg_2Si$, $Mg_2Ge$, $Mg_2Sn$, $Ca_2Si$, $Ca_2Sn$, $Ca_2Pb$, $ZnAs_2$, $Zn_3As_2$, $ZnSb$, $Cd_3As_2$, $CdSb$, $Mg_3Sb_2$, $CdTe$, and $Sb_2Te_3$, and having a thickness substantially equal to $\lambda/4n \pm \lambda/20n$, where $\lambda$ represents a wavelength of light beam to be applied to said device and n represents a refractive index of said single layer.

* * * * *

UNITED STATES PATENT AND TRADEMARK OFFICE
CERTIFICATE OF CORRECTION

PATENT NO. : 4,470,669          Page 1 of 3

DATED : September 11, 1984

INVENTOR(S) : Keiichi KUBOTA; Masakazu NAKANO

It is certified that error appears in the above-identified patent and that said Letters Patent is hereby corrected as shown below:

On the title page;

Abstract, line 12, --compound-- should be inserted before "semiconductors";

line 13, --compound-- should be inserted before "semiconductors";

line 15, --compound-- should be inserted before "semiconductors".

Column 1, line 18, after "(CRT)", insert a --,--;

line 33, insert --then-- after "is";

line 45, in the first instance, "scattering" should be in quotes;

line 46, delete "from the side of" and insert --onto--;

line 47, insert --is thereby-- after "and";

UNITED STATES PATENT AND TRADEMARK OFFICE
CERTIFICATE OF CORRECTION

PATENT NO. : 4,470,669
DATED : September 11, 1984
INVENTOR(S) : Keiichi KUBOTA; Masakazu NAKANO It is certified that error appears in the above-identified patent and that said Letters Patent is hereby corrected as shown below:

Column 1, line 64, insert a --)-- after "etc.";

Column 2, line 16-17, --compound-- should be inserted before "semiconductor", delete "compound".

line 17, --semiconductor-- should be inserted after "compound", second occurrence;

Column 4, line 16, "temperaure" should be --temperature--;

line 27, insert --the-- after "to";

line 42, change "Then" to --Thus--;

line 49, delete "(5145A with symbol =)" and insert --(with symbol = 5145A)--;

line 60, insert --that-- after "contemplated".

UNITED STATES PATENT AND TRADEMARK OFFICE
CERTIFICATE OF CORRECTION

PATENT NO. : 4,470,669

DATED : September 11, 1984

INVENTOR(S) : Keiichi KUBOTA; Masakazu NAKANO

It is certified that error appears in the above-identified patent and that said Letters Patent is hereby corrected as shown below:

Column 5, line 8, change "to be" to --of--;

line 16, delete all parenthesis.

Signed and Sealed this

Twenty-fifth Day of June 1985

[SEAL]

Attest:

DONALD J. QUIGG

Attesting Officer

Acting Commissioner of Patents and Trademarks